United States Patent
Kamba (10) Patent No.: US 12,542,969 B2
(45) Date of Patent: Feb. 3, 2026

(54) CONTROL APPARATUS FOR CONTROLLING FOCUS OF IMAGING APPARATUS, IMAGING APPARATUS, CONTROL METHOD, AND STORAGE MEDIUM

(71) Applicant: CANON KABUSHIKI KAISHA, Tokyo (JP)

(72) Inventor: Masaki Kamba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 18/653,823

(22) Filed: May 2, 2024

(65) Prior Publication Data
US 2024/0388798 A1    Nov. 21, 2024

(30) Foreign Application Priority Data
May 15, 2023  (JP) .................................. 2023-080064

(51) Int. Cl.
*H04N 23/67* (2023.01)
*H04N 23/69* (2023.01)

(52) U.S. Cl.
CPC ............. *H04N 23/67* (2023.01); *H04N 23/69* (2023.01)

(58) Field of Classification Search
CPC ...... H04N 23/67; H04N 23/69; H04N 23/673; H04N 23/675
See application file for complete search history.

(56) References Cited

U.S. PATENT DOCUMENTS

| | | | |
|---|---|---|---|
| 7,835,636 B2* | 11/2010 | Yuyama ................. | G03B 13/36 348/208.6 |
| 10,939,032 B2* | 3/2021 | Park ....................... | G03B 13/36 |
| 2012/0063759 A1* | 3/2012 | Iwasaki ................ | H04N 23/675 396/82 |
| 2017/0104938 A1* | 4/2017 | Shimosato ............. | H04N 23/61 |
| 2019/0297249 A1* | 9/2019 | Kim ..................... | H04N 23/687 |
| 2020/0275014 A1* | 8/2020 | Kamba .................. | G02B 7/282 |
| 2021/0021754 A1* | 1/2021 | Kamba .................. | H04N 23/20 |
| 2022/0377243 A1* | 11/2022 | Choi ..................... | H04N 23/667 |
| 2024/0223885 A1* | 7/2024 | Kim ........................ | H04N 5/77 |

FOREIGN PATENT DOCUMENTS

JP           2009031760 A     2/2009

* cited by examiner

*Primary Examiner* — Padma Haliyur
(74) *Attorney, Agent, or Firm* — Canon U.S.A., Inc., IP Division (57) ABSTRACT

A control apparatus includes at least one memory storing instructions, and at least one processor that, upon execution of the instructions, configures the at least one processor to acquire a size of a subject in a captured image, calculate a difference between the acquired size of the subject and a target size, control a position of a zoom lens to reduce the calculated difference, identify a search range to determine a position of a focus lens, based on the position of the zoom lens and the calculated difference, and cause an image capture device to execute autofocus control to focus on the subject within the identified search range.

14 Claims, 10 Drawing Sheets

■ FOCUS LIMIT TABLE – 5 m (IMAGE)

| | | SIZE DIFFERENCE [%] (TARGET SIZE - CURRENT SIZE) | | | | | | |
|---|---|---|---|---|---|---|---|---|
| | | -30 | -20 | -10 | 0 | 10 | 20 | 30 |
| CURRENT ZOOM POSITION | WIDE | | | | 5 m | | | ∞ |
| | 100 | 0.1 m | ... | 4.5 m | | 6 m | ... | ∞ |
| | 200 | 0.1 m | ... | 4.4 m | | 6.1 m | ... | ∞ |
| | 300 | 0.1 m | ... | 4.3 m | | 6.2 m | ... | ∞ |
| | 400 | 0.1 m | ... | 4.2 m | | 6.3 m | ... | ∞ |
| | TELE | 0.1 m | ... | 4.1 m | | 6.4 m | ... | |

WIDE/NEAR DIRECTION ← → TELE/FAR DIRECTION

■ FOCUS LIMIT TABLE – 2 m (IMAGE)

| | | SIZE DIFFERENCE [%] (TARGET SIZE - CURRENT SIZE) | | | | | | |
|---|---|---|---|---|---|---|---|---|
| | | -30 | -20 | -10 | 0 | 10 | 20 | 30 |
| CURRENT ZOOM POSITION | WIDE | | | | 2 m | | | ∞ |
| | 100 | 0.1 m | ... | 1.8 m | | 2.6 m | ... | ∞ |
| | 200 | 0.1 m | ... | 1.7 m | | 2.5 m | ... | ∞ |
| | 300 | 0.1 m | ... | 1.6 m | | 2.4 m | ... | ∞ |
| | 400 | 0.1 m | ... | 1.5 m | | 2.3 m | ... | ∞ |
| | TELE | 0.1 m | ... | 1.4 m | | 2.2 m | ... | |

WIDE/NEAR DIRECTION ← → TELE/FAR DIRECTION

FIG.10

CONTROL APPARATUS FOR CONTROLLING FOCUS OF IMAGING APPARATUS, IMAGING APPARATUS, CONTROL METHOD, AND STORAGE MEDIUM

BACKGROUND

Technical Field

The present disclosure relates to a control apparatus, an imaging apparatus, a control method, and a storage medium.

Description of the Related Art

In recent years, there has been an increasing need for a remote camera or the like to track and automatically capture a moving subject in a scene with motion, such as a lecture or a sports scene. As a technique for realizing automatic imaging, a technique is known in which a subject as a tracking target is captured within an angle of view by automatically performing a pan/tilt operation in accordance with the movement of the subject as a tracking target. In addition, an autofocus for focusing on a subject as a tracking target is also known.

In an imaging apparatus discussed in Japanese Patent Application Laid-Open No. 2009-031760, a change in a subject distance is estimated based on a change in the size of a subject's face, and a search direction or a search range of a focus lens position is set based on a result of the estimation. This facilitates a speedy and stable focusing operation to respond to the change in the subject distance.

SUMMARY

According to an aspect of the present invention, a control apparatus includes at least one memory storing instructions and at least one processor that, upon execution of the stored instructions configures the at least one processor to acquire a size of a subject in a captured image, calculate a difference between the acquired size of the subject and a target size, control a position of a zoom lens to reduce the calculated difference, identify a search range to determine a position of a focus lens, based on the position of the zoom lens and the calculated difference, and cause an image capture device to execute autofocus control to focus on the subject within the identified search range.

Further features of the present disclosure will become apparent from the following description of exemplary embodiments with reference to the attached drawings.

DESCRIPTION OF THE EMBODIMENTS

Embodiments of the present disclosure will now be described in detail with reference to the accompanying drawings. The following embodiments do not limit the present disclosure, and not all combinations of features described in the embodiments are necessarily essential for the solving means of the present disclosure. The configuration of the embodiment can be appropriately modified or changed according to the specifications and various conditions (use conditions, use environment, and the like) of the system and the apparatus to which the disclosure is applied. The technical scope of the present disclosure is defined by the scope of the claims, and is not defined by the individual embodiments described below.

In the following description, components illustrated in any of the drawings first referred to will be referred to in the description of any of the other drawings as appropriate.

<Configuration of Imaging System>

Figure 1:
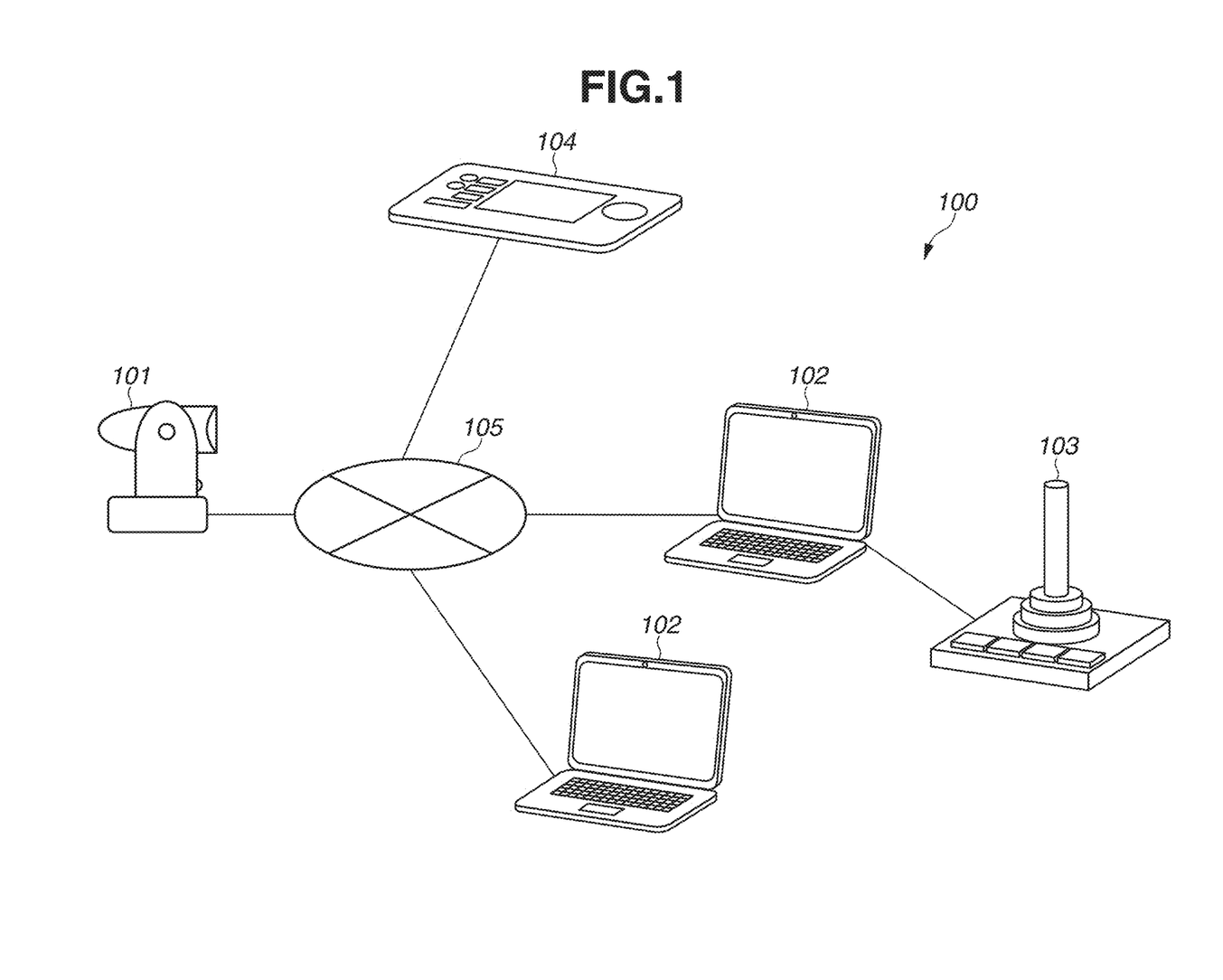
FIG. 1 is a configuration diagram illustrating a configuration of an imaging system.

FIG. 1 is a configuration diagram illustrating a configuration of an imaging system including an imaging apparatus according to an exemplary embodiment of the present disclosure.

An imaging system 100 illustrated in FIG. 1 includes a camera 101, control terminals 102, a joystick 103, a camera controller 104, and a network 105. The camera 101 corresponds to the imaging apparatus according to the present exemplary embodiment.

The camera 101 performs imaging in response to a request from any of the control terminals 102 via the network 105, and transmits captured video data and information about the camera 101 to the control terminal 102 via the network 105. The camera 101 may actively transmit data to a control terminal 102 connected in advance.

Each of the control terminals 102 is a general client terminal including a display unit such as a display and an operation unit, and is specifically, for example, a personal computer (PC) or a tablet. Although PCs in each of which a monitor and an input device are integrated are illustrated in FIG. 1 as an example, the control terminals 102 may each be an apparatus in which a monitor and an input device are independently provided.

The joystick 103 is connected to each of the control terminals 102 via a universal serial bus (USB), Bluetooth®, or the like, and is used as an input device for remotely operating the camera 101.

The joystick 103 is used to realize smooth pan, tilt, and zoom (PTZ) operations, which are especially difficult to perform with a graphical user interface (GUI) on an application.

The camera controller 104 is hardware including an operation unit for operating the camera 101. The camera controller 104 can also perform operations for switching on/off an automatic tracking function that will be described below and making detailed settings of the automatic tracking function. In FIG. 1, the camera controller 104 and the camera 101 are connected via the network 105 as an example, but the camera controller 104 and the camera 101 may be connected using serial connection or the like.

The network 105 connects the camera 101, the control terminals 102 and the camera controller 104. The network 105 is implemented by a plurality of routers, switches, cables, and the like that conform to a communication standard such as Ethernet®. The network 105 may be implemented by the Internet, a wired local area network (LAN), a wireless LAN, a wide area network (WAN), or the like.

<Functional Configuration of Camera>

Figure 2:
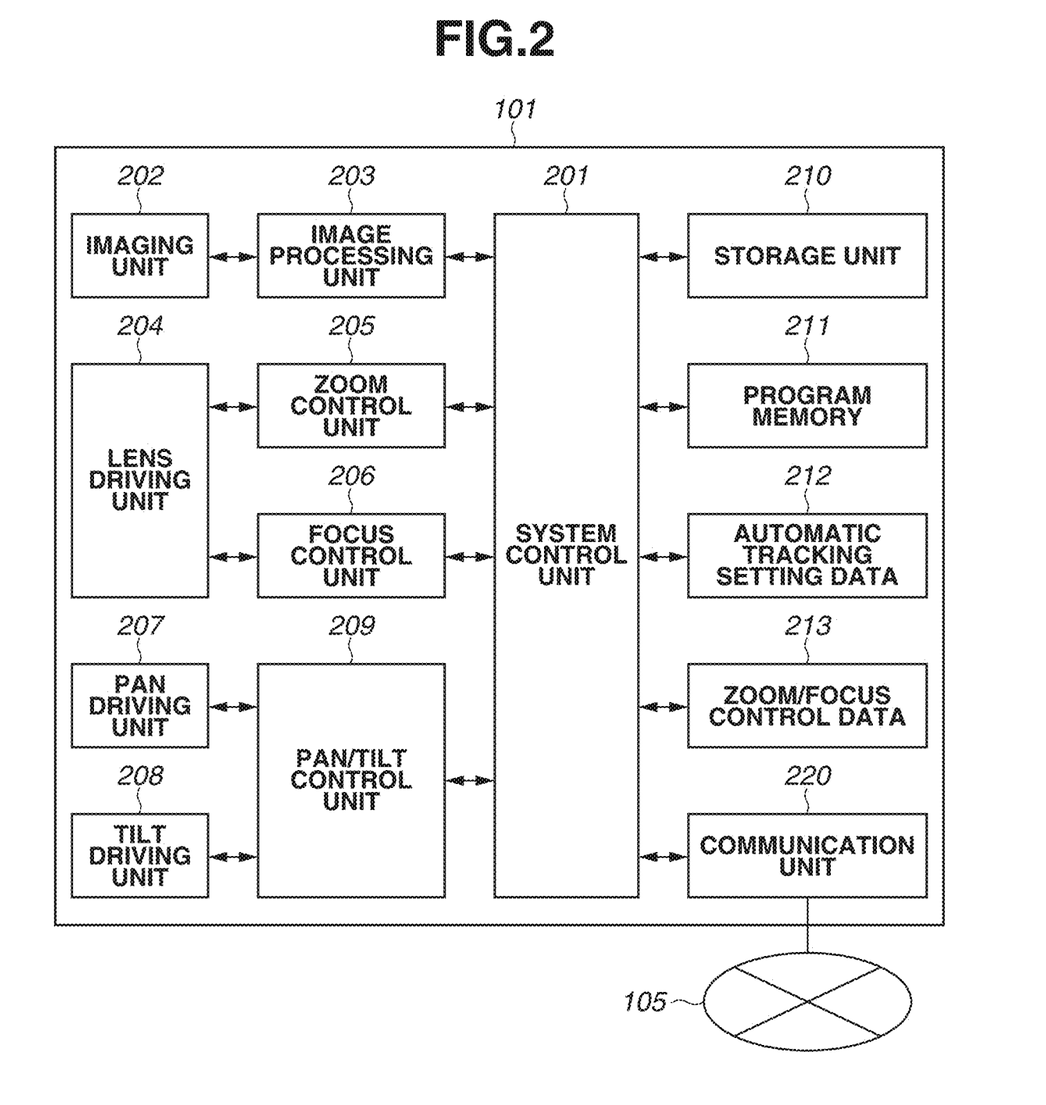
FIG. 2 is a block diagram illustrating an example of a functional configuration of a camera.

FIG. 2 is a block diagram illustrating an example of a functional configuration of the camera 101.

The camera 101 includes a system control unit 201, an imaging unit 202, an image processing unit 203, a lens driving unit 204, a zoom control unit 205, a focus control unit 206, a pan driving unit 207, a tilt driving unit 208, and a pan/tilt control unit 209. These components are components related to imaging and driving of the camera 101. The camera 101 further includes a storage unit 210, a program memory 211, automatic tracking setting data 212, zoom/focus control data 213, and a communication unit 220 as components related to data and communication.

The system control unit 201 controls the entire camera 101 and instructs the other components to perform processing. The system control unit 201 analyzes camera control commands transmitted from the control terminals 102 and received by the communication unit 220, and executes processing according to the camera control commands. The camera control commands are classified into request commands for requesting acquisition of video data and setting values and setting commands for requesting setting of setting values.

More specifically, the camera control commands mainly include a video data request command, a command for requesting setting values related to zooming, focusing, panning, and tilting of the camera 101, a command for requesting setting values related to imaging and image processing, and a setting command for setting values.

The system control unit 201 receives, for example, a video data request command from any of the control terminals 102 via the communication unit 220, and distributes video data generated by the image processing unit 203 via the communication unit 220.

The system control unit 201 receives, for example, a command for requesting setting values related to imaging, such as zooming, focusing, panning, and tilting of the camera 101, from any of the control terminals 102.

The system control unit 201 that has received the command for requesting the setting values reads respective setting values from the image processing unit 203, the zoom control unit 205, the focus control unit 206, and the pan/tilt control unit 209, and distributes the setting values to the control terminal 102 via the communication unit 220.

In the present specification, "setting" related to imaging means not only giving a control target in control of a PTZ operation, focusing, or the like, but also operating an actual lens position or the like in control. Therefore, the "setting values" related to imaging include not only control target values but also the current values of zooming, focusing, panning/tilting, and the like obtained as a result of control. Further, the "setting values" related to imaging include a range of values settable as a control target.

When the system control unit 201 receives a setting command for setting values related to imaging, the system control unit 201 instructs the image processing unit 203, the zoom control unit 205, the focus control unit 206, and the pan/tilt control unit 209 to perform control based on respective setting values indicated by the setting command.

The image processing unit 203, the zoom control unit 205, the focus control unit 206, and the pan/tilt control unit 209 control the imaging unit 202, the lens driving unit 204, the pan driving unit 207, and the tilt driving unit 208 based on the instruction from the system control unit 201. Thus, the setting values set by the control terminal 102 are reflected in the camera 101.

The imaging unit 202 includes a lens and an imaging element, and performs imaging of a subject and conversion into an electric signal.

The image processing unit 203 performs predetermined image processing, resolution-conversion processing, and compression coding processing on a signal obtained by the imaging and the photoelectric conversion in the imaging unit 202, thereby generating video data.

The video data generated by the image processing unit 203 is distributed to the control terminal 102 by the communication unit 220 via the network 105.

The lens driving unit 204 includes driving systems for a focus lens and a zoom lens and motors serving as driving sources for the driving systems, and is controlled by the zoom control unit 205 and the focus control unit 206. The zoom control unit 205 and the focus control unit 206 control lens positions based on data on cam track curves included in the zoom/focus control data 213.

The pan driving unit 207 includes a mechanical driving system for performing a pan operation and a motor as a driving source, and the operation of the pan driving unit 207 is controlled by the pan/tilt control unit 209.

The tilt driving unit 208 includes a mechanical driving system for performing a tilt operation and a motor as a driving source, and the operation of the tilt driving unit 208 is also controlled by the pan/tilt control unit 209.

The pan/tilt control unit 209 controls the pan driving unit 207 and the tilt driving unit 208 based on a pan/tilt setting value output from the system control unit 201, and changes the pan/tilt.

The control of the camera 101 includes control related to automatic imaging, and the camera 101 can automatically perform control depending on an imaging environment. For example, in autofocus control in which the camera 101 automatically focuses on a subject, the image processing unit 203 calculates an evaluation value from the contrast of an image captured by the imaging unit 202. Then, the focus control unit 206 that has acquired the evaluation value via the system control unit 201 controls the focus lens according to the evaluation value so as to focus on the subject.

As automatic control other than the autofocus control, there are automatic pan/tilt control for continuously capturing a subject within an imaging angle of view, and zoom control for continuously capturing a subject in a target imaging size. The automatic pan/tilt control is performed by the pan/tilt control unit 209 based on an instruction from the system control unit 201. The zoom control is performed by the zoom control unit 205 based on an instruction from the system control unit 201, and the zoom control unit 205 controls the zoom lens so as to reduce a difference between the imaging size of a subject and a target size.

In the following description, it is assumed that the pan/tilt control, the zoom control, and the autofocus control are all executed in the automatic tracking imaging.

The image processing unit 203 can also automatically control exposure (i.e., aperture, shutter speed, gain, neutral density (ND) filter, etc.), white balance, noise reduction, gamma, and the like.

The storage unit 210 stores video data in a storage device such as a memory or a storage. The memory and the storage may be an internal memory and an internal storage, or may be an external memory and an external storage.

The program memory 211 is a memory that stores a camera control program, and the system control unit 201 executes various control commands based on the camera control program stored in the program memory 211.

The automatic tracking setting data 212 is data on detailed settings regarding automatic tracking, such as an ON/OFF setting as to whether automatic tracking is performed, and a target size as to how large a tracking subject is to be kept constant. The automatic tracking setting data 212 may be predetermined fixed data or variable data set via the communication unit 220.

The zoom/focus control data 213 is data necessary for zoom control and autofocus control, such as a cam track curve.

The communication unit 220 distributes video data to the control terminal 102 via the network 105. The communication unit 220 receives a camera control command transmitted from the control terminal 102 and outputs the camera control command to the system control unit 201. Then, the communication unit 220 distributes a response to the control terminal 102 based on an instruction from the system control unit 201.

The configuration illustrated in FIG. 2 is merely an example, and a plurality of functional blocks may constitute one functional block, or any of the functional blocks may be divided into blocks that perform a plurality of functions. At least one of the functional blocks may be implemented as hardware.

In the case where any of the functional blocks is implementation by hardware, for example, a dedicated circuit may be automatically generated on a field programmable gate array (FPGA) from a program for realizing each step by using a predetermined compiler. Further, any of the functional blocks may be implemented as hardware by forming a gate array circuit in the same manner as the FPGA, or may be implemented by using an application specific integrated circuit (ASIC).

<Hardware Configuration of Camera>

Figure 3:
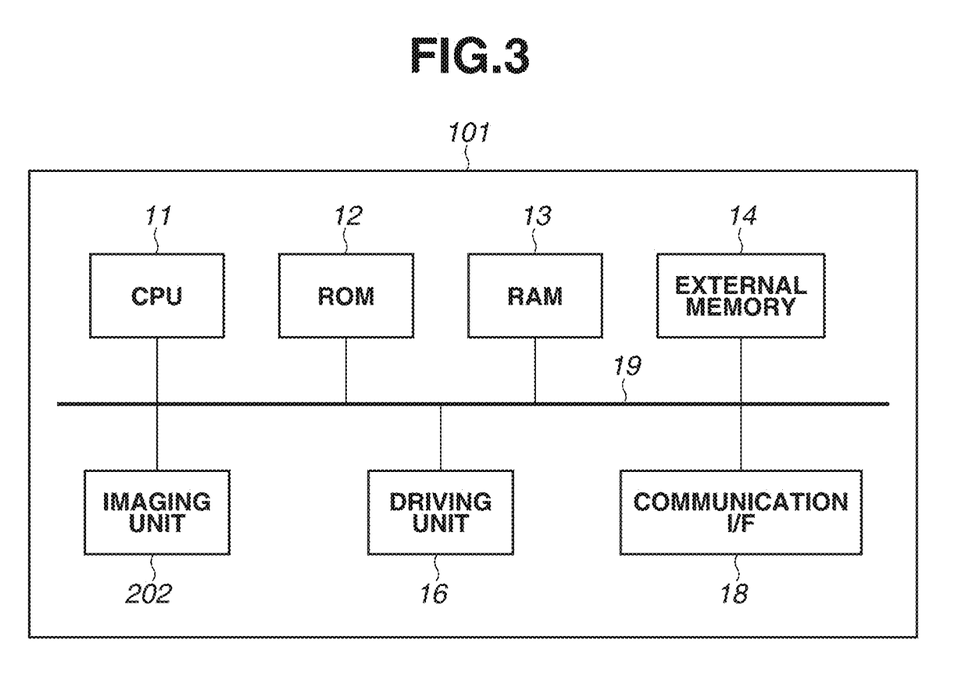
FIG. 3 is a block diagram illustrating an example of a hardware configuration of a camera.

FIG. 3 is a block diagram illustrating an example of a hardware configuration of the camera 101 according to the present exemplary embodiment.

The camera 101 includes a central processing unit (CPU) 11, a read only memory (ROM) 12, and a random access memory (RAM) 13. The camera 101 further includes an external memory 14, a driving unit 16, and a communication interface (I/F) 18, and also includes the imaging unit 202 described above.

These elements included in the camera 101 are connected to each other by a bus 19. The portion of the camera 101 excluding the imaging unit 202 is, for example, an embedded computer, and this portion corresponds to a control apparatus according to the present exemplary embodiment.

The CPU 11 executes a program, an operating system (OS), and the like that cause a computer to operate as the control apparatus. The ROM 12 stores a program (for example, a basic input/output system (BIOS)) for implementing basic functions of the computer and a camera control program, and functions as the program memory 211 described above. The RAM 13 stores setting values used by the CPU 11, and the external memory 14 stores video data. The camera 101 may include a storage instead of the memory or in addition to the memory.

The automatic tracking setting data 212 described above is stored in, for example, the RAM 13, and the zoom/focus control data 213 described above is stored in, for example, the ROM 12.

The driving unit 16 includes a pan/tilt head, a motor, and the like, and functions as the pan driving unit 207 and the tilt driving unit 208 described above.

The communication I/F 18 functions as the communication unit 220 described above. The camera 101 may include a voice output unit, an input unit such as a button, and a display unit such as a display.

<Cam Track Curve>

Here, a cam track curve representing a relationship between the lens position of the zoom lens and the lens position of the focus lens will be described.

Figure 4:
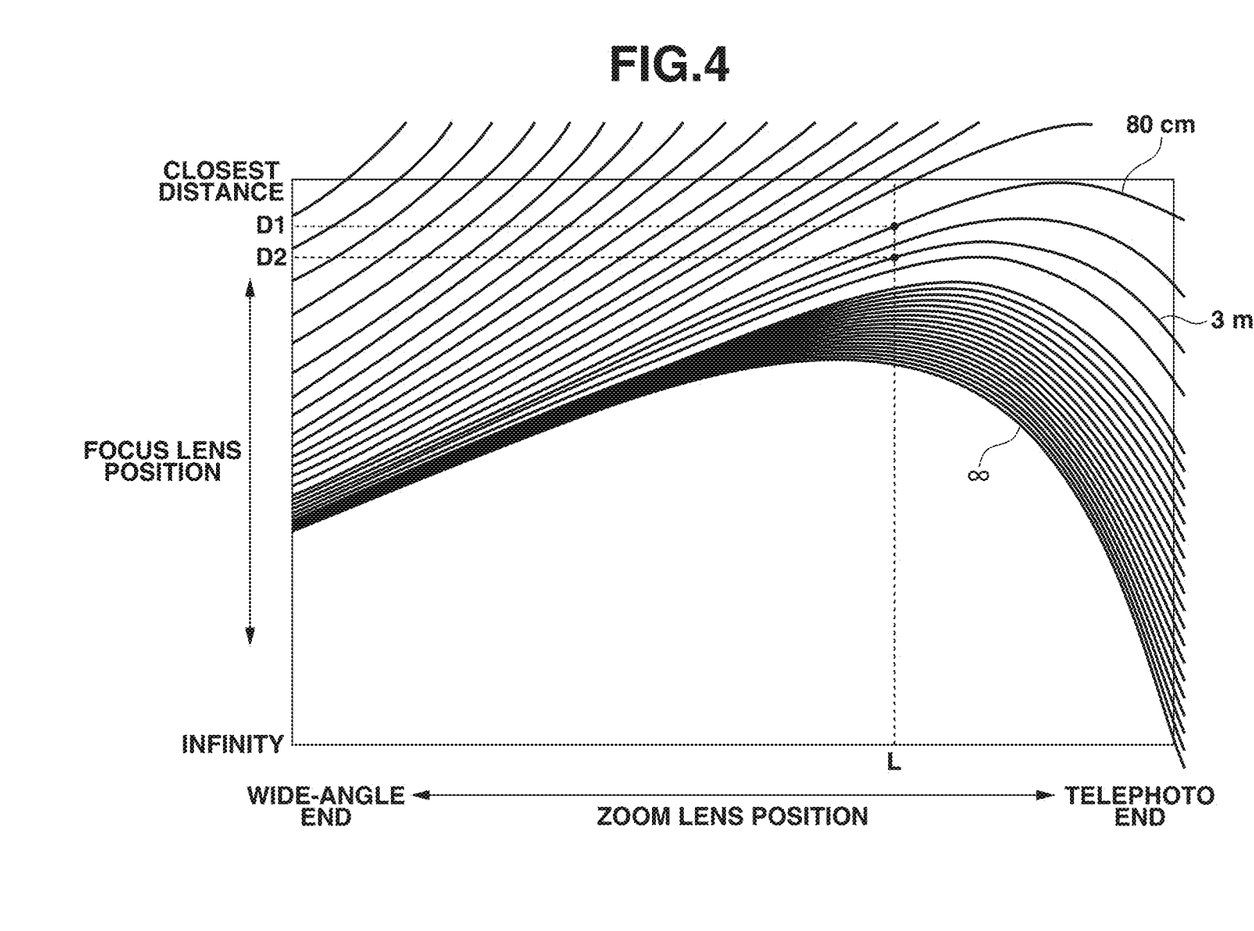
FIG. 4 is a graph illustrating an example of a cam track curve.

FIG. 4 is a graph illustrating an example of a cam track curve.

The horizontal axis of FIG. 4 indicates the lens position of the zoom lens at a zoom magnification from the minimum (wide-angle end) to the maximum (telephoto end), and the vertical axis indicates the lens position of the focus lens at a subject distance from infinity to the closest distance. Each cam track curve illustrated in the graph of FIG. 4 indicates a cam track that causes the imaging element to focus on an image of a subject existing at the same subject distance at each of different zoom magnifications.

Thus, subjects at different subject distances will be in focus at focus lens positions on different cam track curves. For example, in the case of a zoom lens position L illustrated in FIG. 4, if a subject is at a subject distance of 80 cm, the subject is in focus at a first focus lens position D1, and if a subject is at a subject distance of 3 m, the subject is in focus at a second focus lens position D2.

When zoom control is performed while a subject is being kept in focus at a certain distance, the positions of the focus lens and the zoom lens are controlled along the cam track curve in FIG. 4, and thus cam track data representing the cam track curve is required. In the camera 101, the cam track data is included in the zoom/focus control data 213 in the form of a table or the like, and is held in a cam track holding portion on the ROM 12, for example.

However, in order to hold tables of cam track data on the memory in a finely detailed manner with respect to subject distances, a huge memory capacity is required. Therefore, in the present exemplary embodiment, only tables of cam track data on some reference subject distances are held in the memory, and cam track data on subject distances other than the reference subject distances is calculated by interpolation processing.

<Configuration of Client Apparatus>

Next, a client apparatus, an example of which is each of the control terminals 102 or the camera controller 104 illustrated in FIG. 1, will be described.

Figure 5:
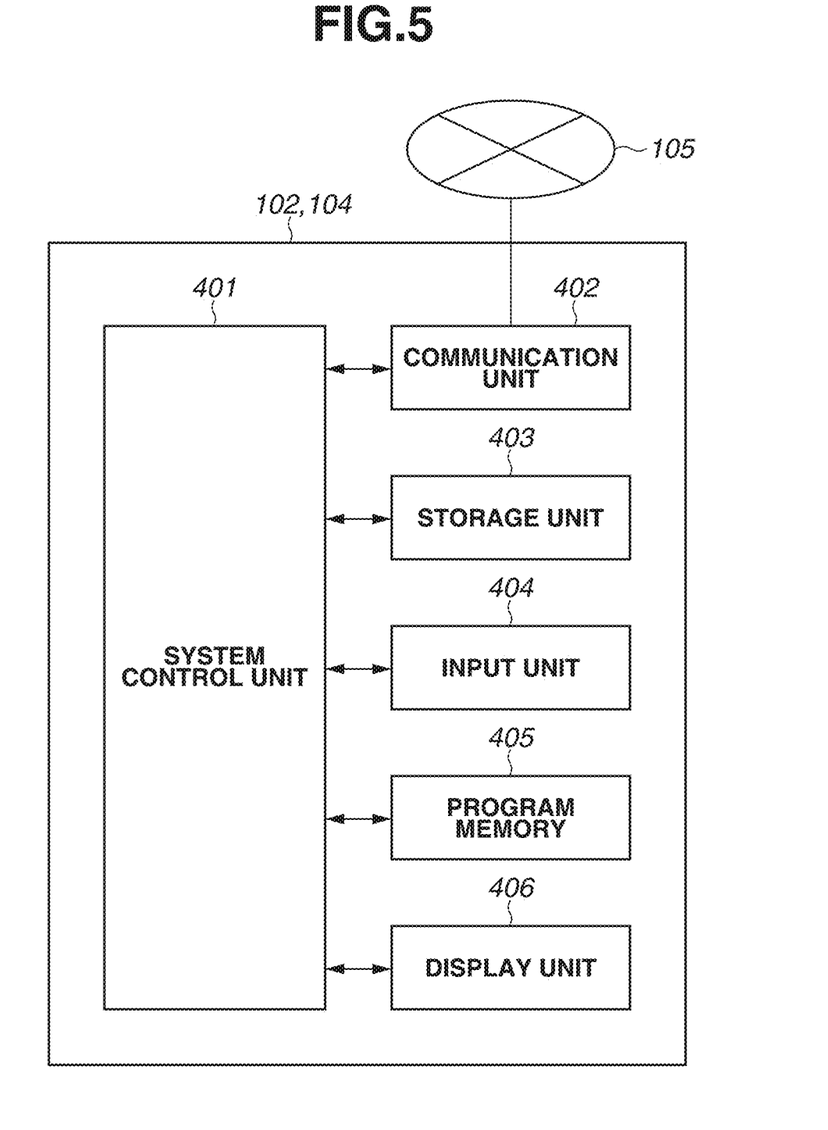
FIG. 5 is a block diagram illustrating an example of a configuration of a client apparatus.

FIG. 5 is a block diagram illustrating an example of a configuration of the client apparatus.

The client apparatus corresponds to the control terminals 102 or the camera controller 104 as a specific example, and is referred to as "client apparatus 102 or 104" below. The client apparatus 102 or 104 is an apparatus for a user to control the camera 101 by issuing a camera control command. The client apparatus 102 or 104 includes a system control unit 401, a communication unit 402, a storage unit 403, an input unit 404, a program memory 405, and a display unit 406.

The system control unit 401 controls the entire client apparatus 102 or 104, and instructs the other components to perform processing. The system control unit 401 generates a camera control command in response to an input operation or a GUI operation performed by the user using the input unit 404, and transmits the camera control command to the camera 101 via the communication unit 402.

Transmission of camera control commands to the camera 101 enables remote control, such as PTZ control, to be performed. Further, the transmission of camera control commands enables the user to perform operations for switching on/off the automatic tracking function and making detailed settings. The system control unit 401 receives a response from the camera 101 via the communication unit 402, analyzes the response, and performs processing according to the response.

The communication unit 402 transmits a camera control command and receives various data distributed from the camera 101.

The storage unit 403 stores camera information, trace information, and the like, which will be described below, in a storage device such as a memory or a storage.

The input unit 404 receives an input made by a user using a device such as a button, a keyboard, a mouse, or a joystick provided in the hardware.

The program memory 405 is a memory that stores a terminal control program, and the system control unit 401 executes various operations based on the terminal control program stored in the program memory 405.

The display unit 406 displays a video of the camera 101 or displays a current value such as a lens position in the camera 101. Alternatively, a touch panel in which the display unit 406 and the input unit 404 are integrated may be provided.

The display unit 406 also displays an application screen for making tracking settings related to automatic tracking imaging.

Figure 6:
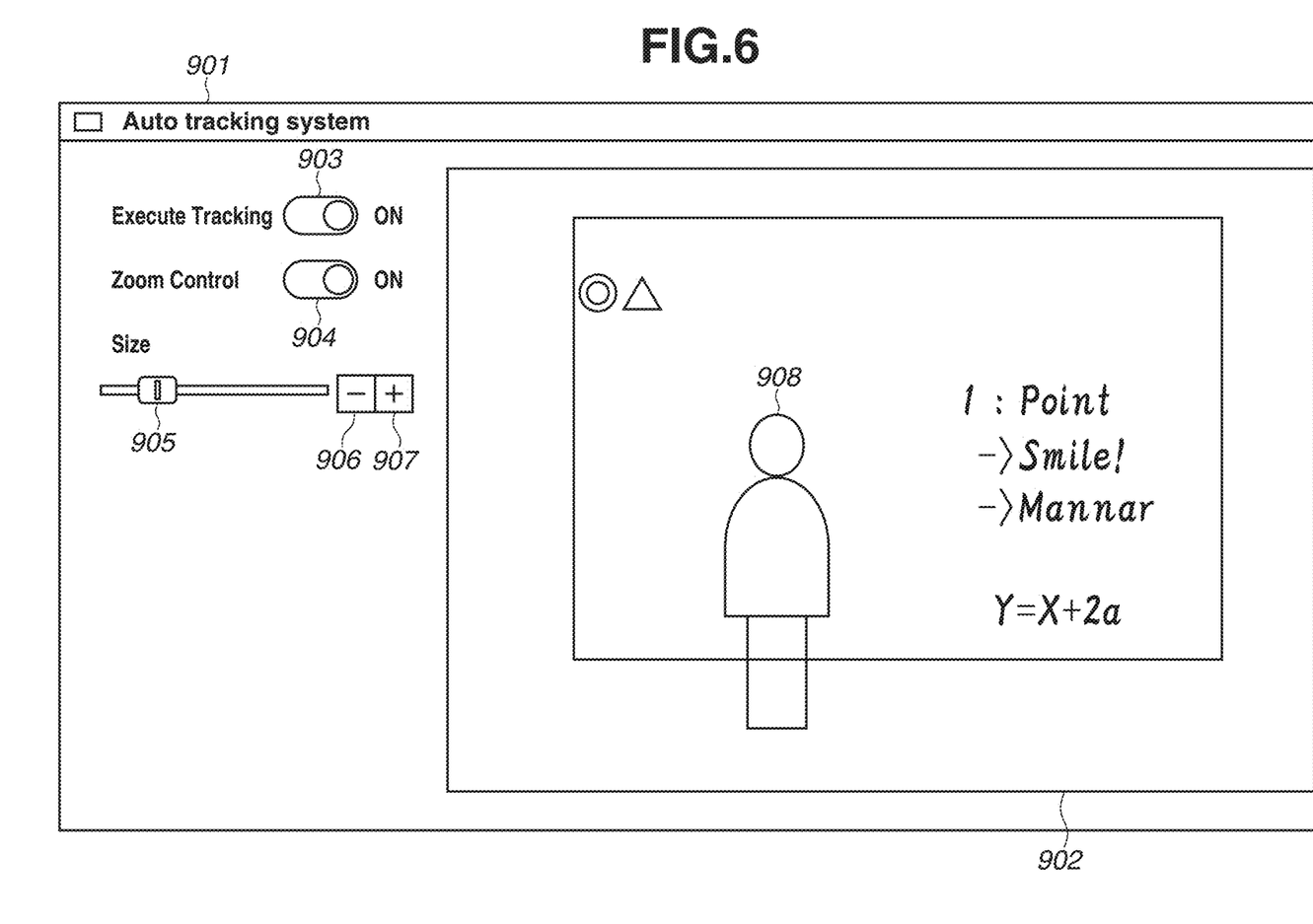
FIG. 6 is a diagram illustrating an example of an application screen.

FIG. 6 is a diagram illustrating an example of the application screen.

An application screen 901 is a screen for the user to set the size and position of a tracking subject in a case of performing zoom control during tracking. The application screen 901 is displayed on the display unit 406 by a web application that makes tracking settings.

A captured video 902 obtained by the camera 101 is displayed on the application screen 901.

The application screen 901 includes a setting button 903 for setting ON/OFF of the automatic tracking function and a designation button 904 for designating whether to perform zoom control during tracking.

In the example illustrated in FIG. 6, the designation button 904 is in the "ON" state indicating that "zoom control is to be performed". When the designation button 904 is in the "ON" state, a slider bar 905 is activated to allow the user to set a target size of a tracking subject by performing a drag operation.

A reduction button 906 and an enlargement button 907 are provided together with the slider bar 905. When the reduction button 906 is clicked, the target size is changed to be smaller, and when the enlargement button 907 is clicked, the target size is changed to be larger.

An icon 908 indicating the target size and position of a subject as a tracking target is displayed on the captured video 902. The size of the icon 908 changes according to the target size set by using the slider bar 905, the reduction button 906, and the enlargement button 907. Further, the position of the subject as the tracking target can be set and changed by dragging and dropping the icon 908.

When the tracking settings are changed on the application screen 901, the camera 101 updates the automatic tracking setting data 212. Then, the automatic tracking imaging is executed in accordance with the updated settings.

<Autofocus During Zooming>

Next, autofocus control to be performed during zoom control will be described.

Figure 7:
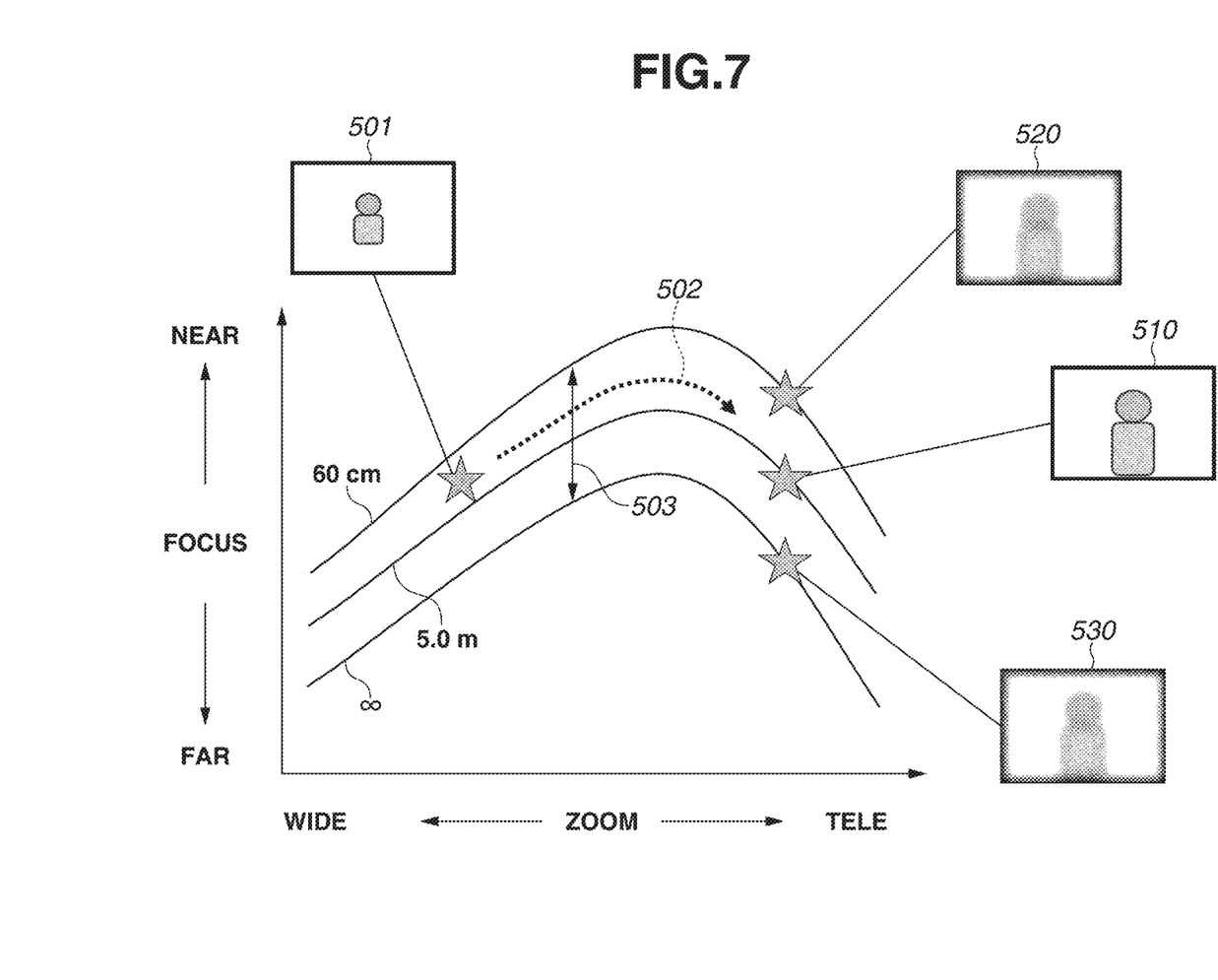
FIG. 7 is a diagram illustrating a comparative example of autofocus control during zoom control.
Figure 8:
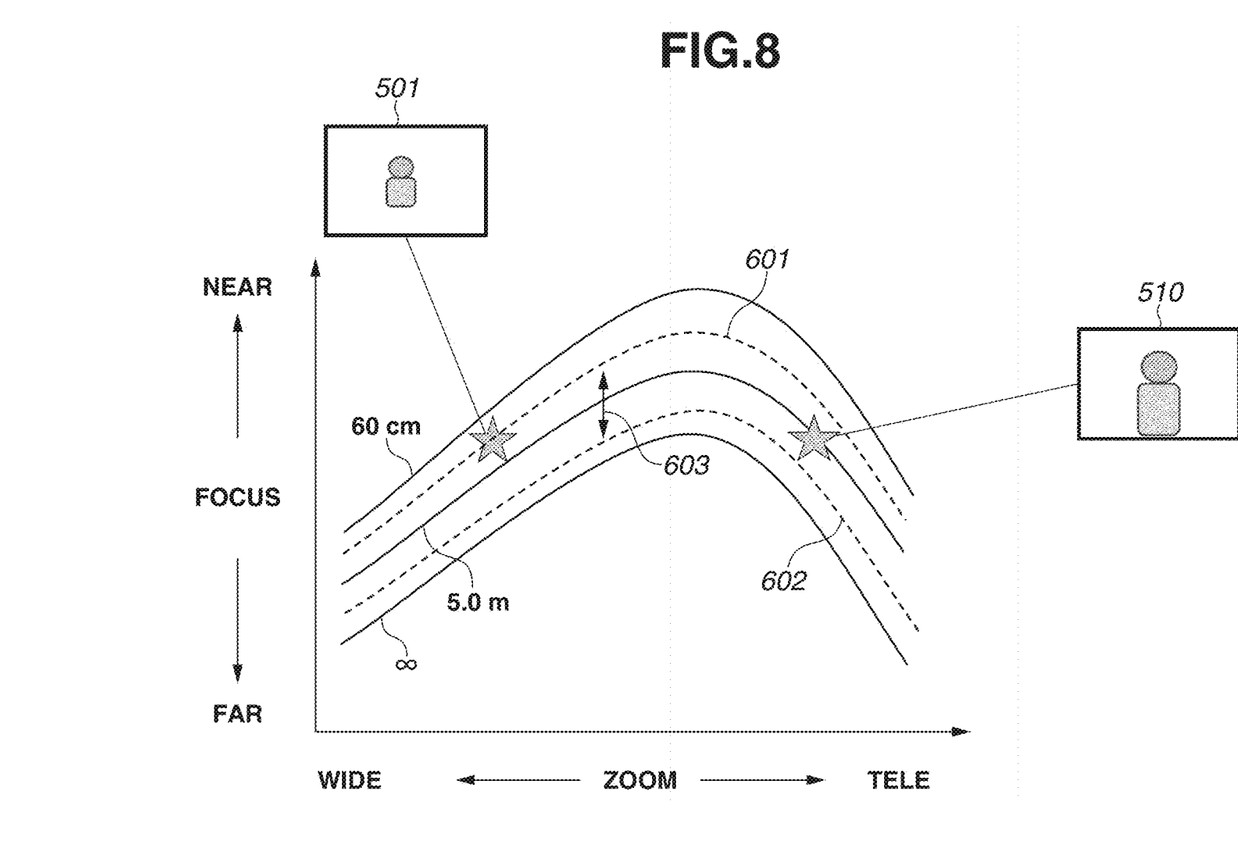
FIG. 8 is a diagram illustrating the autofocus control during the zoom control.

FIG. 7 is a diagram illustrating a comparative example of autofocus control during zoom control, and FIG. 8 is a diagram illustrating autofocus control during zoom control in the present exemplary embodiment.

In FIGS. 7 and 8, the cam track curves described in FIG. 4 are simply illustrated, and as an example, cam track curves corresponding to respective subject distances of 60 cm, 5.0 m, and infinity (represented as "∞" in FIGS. 7 and 8) are illustrated. As in FIG. 4, the horizontal axis of each of FIGS. 7 and 8 indicates the lens position of the zoom lens, and the vertical axis indicates the lens position of the focus lens. In the following description, the lens position of the zoom lens may be referred to as a "zoom position", and the lens position of the focus lens may be referred to as a "focus position".

An image 501 illustrated on the left side of FIG. 7 is an example of an image obtained at an angle of view at which the camera 101 is currently performing imaging, and, for example, the zoom position is closer to the wide-angle end (represented as "WIDE" in FIGS. 7 and 8) and the focus position is between 60 cm and 5.0 m. The subject is moving in a direction away from the camera 101, for example, to 5.0 m, and the subject in the image 501 is smaller than the target size and is becoming out of focus. Thus, autofocus control is required together with zoom control in a telephoto (represented as "TELE" in FIGS. 7 and 8) direction.

In the comparative example, the zoom position and the focus position during the zoom control change along a cam track curve 502 for a subject distance at the start of zooming, and the focus position moves upward and downward in the vertical direction of FIG. 7 by the autofocus control to search for an in-focus position. A search range 503 of the in-focus position is between the cam track curve for the closest distance and the cam track curve for the infinite distance (∞), and the focus lens is driven over the search range 503.

Three images 510, 520, and 530 illustrated on the right side of FIG. 7 are examples of images obtained at an angle of view after the zoom control is performed. The image 510 in the center of the three images 510, 520, and 530 corresponds to a case where the subject is in-focus after the zoom control, and the focus position is shifted on the cam track curve for 5.0 m.

In contrast, the top and bottom images 520 and 530 of the three images 510, 520, 530 each correspond to a case where the search for the focus position has failed. In the case of the top image 520, the subject has become out of focus in the middle of the zoom control along the cam track curve 502, and the focus position has moved to the search end on the NEAR side. In the case of the bottom image 530, the focus position has moved past the in-focus position to the search end on the FAR side.

In the comparative example, because the search range 503 of the autofocus is too wide, the contrast of the image is lost when the subject is greatly out of focus, and thus the evaluation value does not vary. As a result, it is considered that the focus lens may be driven in the direction opposite to the direction of the in-focus position. In addition, it may be difficult to search for the in-focus position due to the background of the subject or the like.

Therefore, in the camera 101 according to the present exemplary embodiment, as illustrated in FIG. 8, the search range 603 of the in-focus position is limited in the autofocus control during the zoom control.

On the left side of FIG. 8, the image 501 obtained at the angle of view before the zoom control is illustrated, and the movement of the subject is the same as that in FIG. 7.

Since the zoom control is a control for capturing the subject in the target size, the size of the subject in the image 501 is detected at the start of the zoom control. Then, a target zoom position is calculated based on the detected subject size and the target size of the subject set based on the automatic tracking setting data 212. In the zoom control, the zoom lens is driven toward the calculated target zoom position.

The image 510 obtained at the angle of view according to the target zoom position and focus position is illustrated on the right side of FIG. 8. The focus position at the target zoom position is reached by searching for the in-focus position by the autofocus control during the zoom control.

In the present exemplary embodiment, the search range 603 of the in-focus position is determined between a NEAR side limit 601 and a FAR side limit 602. The system control unit 201 determines the search range 603 based on the difference between the imaging size of the subject and the target size, and informs the focus control unit 206 of the search range 603. The focus control unit 206 that has been informed of the search range 603 drives the focus lens within the search range 603.

That is, in the case of the present exemplary embodiment, the range in which the focus lens is driven by the autofocus control during the zoom control is narrowed to the search range 603 illustrated in FIG. 8. As a result, the search for the in-focus position is executed within a range in which the correct direction of the in-focus position can be obtained based on the evaluation value of the contrast. Therefore, since the out-of-focus state as illustrated in FIG. 7 is avoided, the image 510 in which the subject is in focus is obtained.

In the example illustrated in FIG. 8, the size of the subject being tracked is smaller than the target size and the subject is moving away from the camera 101. Therefore, when the zoom lens and the focus lens are driven in the TELE/FAR direction, it is expected that the in-focus position and the target size are reached. That is, since it is considered unnecessary to search for the in-focus position on the NEAR side of the current subject distance, it is desirable that the cam track curve for the current object distance is set to the NEAR side limit 601.

In the example of FIG. 8, since the subject is away from the camera 101, a search for the in-focus position on the NEAR side is not necessary. On the other hand, when the subject is approaching the camera 101, a search for the in-focus position on the FAR side is not necessary. Therefore, when the zoom control is in the WIDE direction, the cam track curve for the current object distance is set to the FAR side limit 602. In the following description, of the NEAR side limit 601 and the FAR side limit 602, the one closer to the current object distance may be referred to as a "current-side limit", and the other farther from the current object distance may be referred to as a "change-side limit".

As described above, the current-side limit is desirably set to the cam track curve for the current subject distance. Whether the current-side limit is on the NEAR side or the FAR side depends on the direction of the zoom control. That is, when the zoom control is in the TELE direction, the search for the in-focus position is limited to the FAR side, and the current-side limit is set to the NEAR side limit. When the zoom control is in the WIDE direction, the search for the in-focus position is limited to the NEAR side, and the current-side limit is set to the FAR side limit.

The direction of the zoom control is determined by the system control unit 201 based on the difference between the imaging size of the subject and the target size, and the system control unit 201 also determines whether the current-side limit is on the NEAR side or the FAR side. Specifically, when the imaging size is larger than the target size, the system control unit 201 determines the search range 603 to be closer to the FAR side than the current object distance. Further, when the imaging size is smaller than the target size, the system control unit 201 determines the search range 603 to be closer to the NEAR side than the current object distance.

In the example of FIG. 8, the FAR side limit 602 is the change-side limit, and the change-side limit is also desirably any of the cam track curves for the subject distances.

In the present exemplary embodiment, the subject distance of the cam track curve serving as the change-side limit is acquired from a data table described below, based on the difference (difference and ratio) between the current size of the subject as the tracking target and the target size, the current subject distance, and the current zoom position. The data table is stored as a part of the zoom/focus control data 213, for example, and is referred to by the system control unit 201.

If an imaging sensor and an imaging optical system are already determined, it is possible to calculate in advance how much the subject distance has changed, based on the three elements described above, and thus the calculated subject distance is stored in the data table. That is, the system control unit 201 acquires the search range 603 from the data table stored in advance using the subject distance and the zoom position as parameters (arguments). The data table is hereinafter referred to as a "focus limit table".

Figure 9:
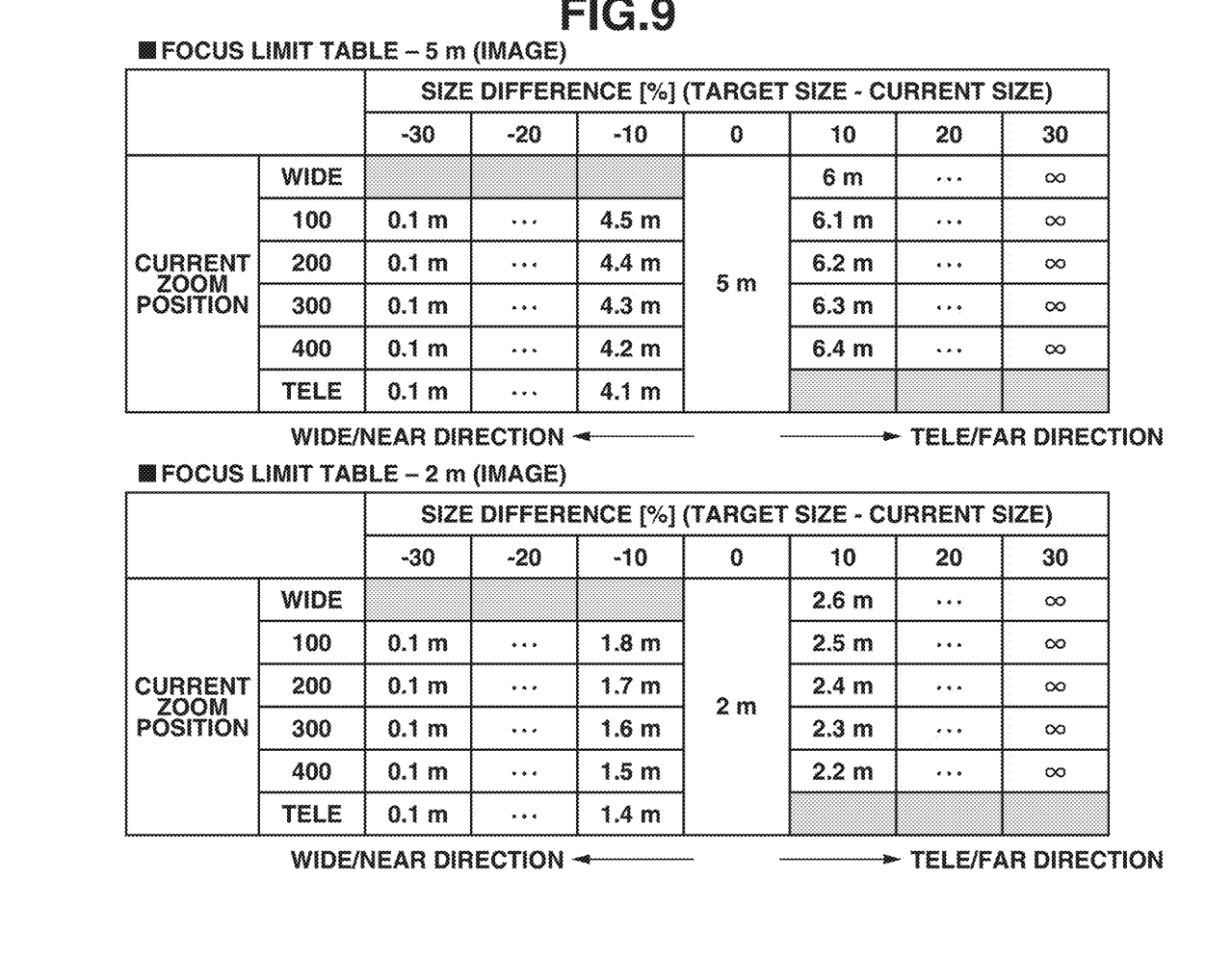
FIG. 9 is an image diagram illustrating focus limit tables.

FIG. 9 is an image diagram illustrating focus limit tables.

Focus limit tables are stored in a distinguishable manner according to a current subject distance. FIG. 9 illustrates, as an example, a focus limit table for a current subject distance of 5 m and a focus limit table for a current subject distance of 2 m.

Each row of the focus limit tables represents a current zoom position, and each column of the focus limit tables represents a difference (size difference) between a current subject size and a target size. The size difference represented in each column of the focus limit tables is an example of an index indicating the difference between the current subject size and the target size.

In the present exemplary embodiment, an index in which a difference and a ratio between the current subject size and the target size are combined is used as the difference between the current subject size and the target size. That is, as the size difference in each focus limit table, a percentage obtained by dividing the difference between the current subject size and the target size by the current subject size is used. As an index indicating the difference between the current subject size and the target size, for example, a size difference may be simply used, or, for example, a ratio between the current subject size and the target size may be used.

The column of the size difference "0" among the columns of each focus limit table indicates a case where the current subject size and the target size are equal, and in this case, the zoom control is not necessary. In the columns on the left side of the column having the size difference "0", the size differences are negative, and thus the zoom control in the WIDE direction is required. In addition, in the columns on the right side of the column of the size difference "0", the size differences are positive, and thus the zoom control in the TELE direction is required.

Each cell of the focus limit tables stores the object distance of the cam track curve serving as the change-side limit. In the columns on the left side of the column of the size difference "0", the search for the in-focus position is performed in the NEAR direction from the current subject distance. In the columns on the right side of the column of the size difference "0", the search for the in-focus position is performed in the FAR direction from the current subject distance.

The value of the subject distance stored in each cell indicates a value further away from the current subject distance as the size difference is larger, and indicates a value closer to the current subject distance as the size difference is smaller. That is, the system control unit 201 referring to the focus limit tables determines the search range to be narrower as the difference between the imaging size and the target size is smaller.

For example, when the current subject distance is 5 m, the current zoom position is at the WIDE end, and the size difference is "10%", the zoom lens and the focus lens are driven in the TELE/FAR direction. The cam track curve serving as the change-side limit is set to a cam track curve for 6 m located on the FAR side, and the search range is from a cam track curve for 5 m to the cam track curve for 6 m.

For another example, when the current subject distance is 2 m, the current zoom position is at the TELE end, and the size difference is "−30%", the zoom lens and the focus lens are driven in the WIDE/NEAR direction. The cam track curve serving as the change-side limit is set to a cam track curve for 0.1 m located on the NEAR side, and the search range is from a cam track curve for 2 m to the cam track curve for 0.1 m.

Since the subject distances stored in the focus limit tables each indicate a limit of the search range of the in-focus position, it is desirable to provide a margin with respect to the in-focus position calculated from the size difference. The focus limit tables illustrated in FIG. 9 store subject distances with margins.

The margins of the object distances may be changed according to the speed of the zoom control or an aperture value in a case where the lens has an aperture mechanism. Even if the subject distance obtained from the focus limit tables is, for example, 2.4 m in the FAR direction, a margin may be added when the speed of the zoom control is high, and the subject distance serving as the change-side limit may be, for example, 2.6 m.

The addition of the margin is specifically performed by the system control unit 201. That is, the system control unit 201 determines the search range 603 to be wider as the moving speed of the zoom lens is higher.

By determining the search range of the in-focus position based on the focus limit tables illustrated in FIG. 9, the out-of-focus state as in the comparative example is suppressed, and deterioration in image quality and losing track of a subject are prevented.

<Processing Operation of Zoom Control>

Next, a processing operation of the zoom control in the present exemplary embodiment will be described.

Figure 10:
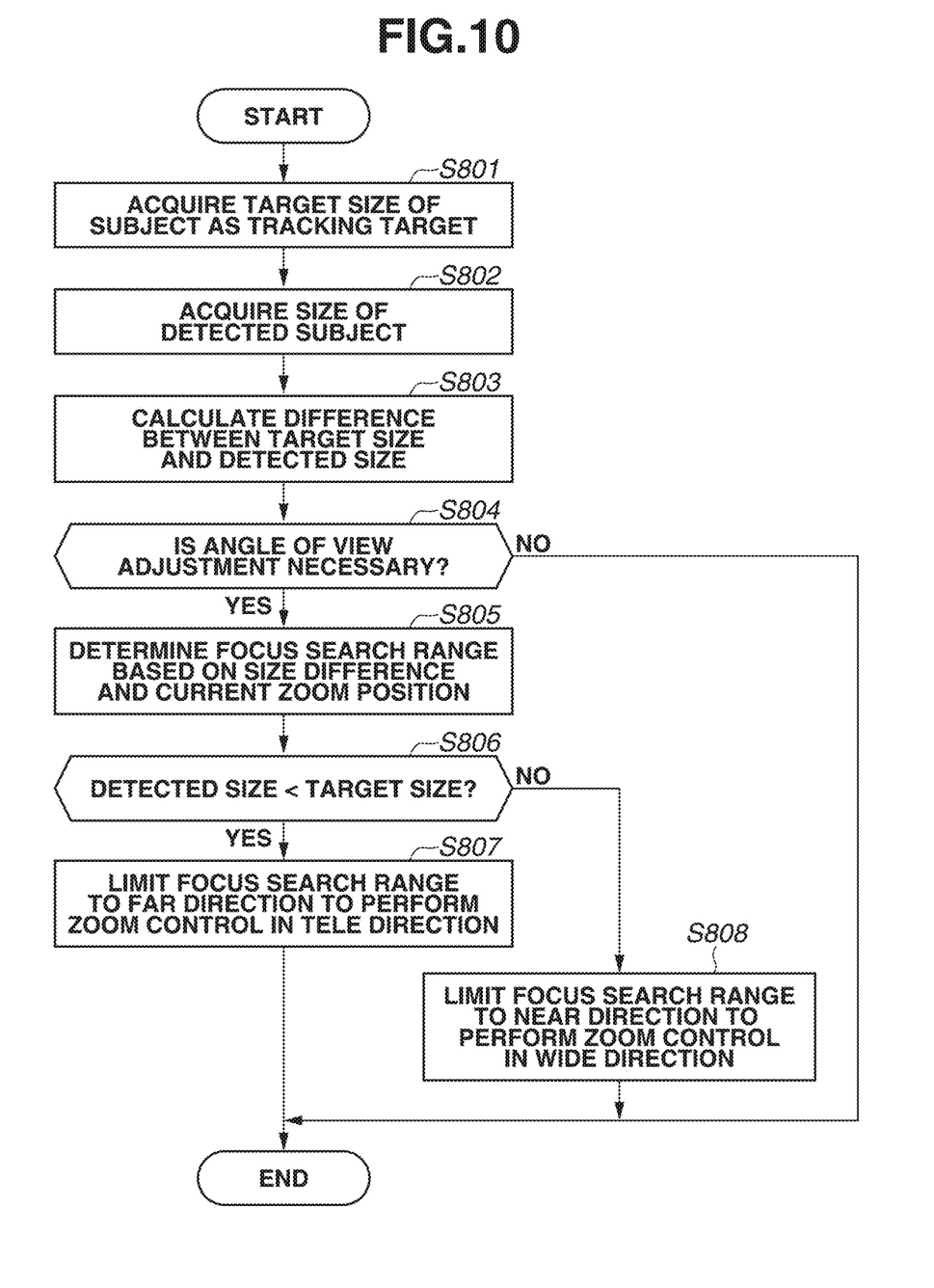
FIG. 10 is a flowchart illustrating a processing operation of the zoom control.

FIG. 10 is a flowchart illustrating the processing operation of the zoom control.

The processing operation illustrated in FIG. 10 is repeatedly executed at a constant interval in a state where the camera 101 is tracking a specific subject.

In step S801, the system control unit 201 acquires the target size of a subject as a tracking target from the automatic tracking setting data 212, and then the processing proceeds to step S802.

In step S802, the image processing unit 203 detects a subject as a tracking target based on a video signal from the imaging unit 202, and acquires the size of the detected subject (hereinafter, referred to as a detected size). Then, the processing proceeds to step S803.

In step S803, the above-described size difference is calculated by the system control unit 201 from the target size acquired in step S801 and the detected size acquired in step S802, and then the processing proceeds to step S804.

In step S804, the system control unit 201 determines whether adjustment of the angle of view by the zoom control is necessary based on the size difference calculated in step S803. More specifically, if the absolute value of the size difference does not exceed a threshold, it is determined that the adjustment of the angle of view is not necessary (NO in step S804), and then the processing of FIG. 10 ends.

If the absolute value of the size difference exceeds the threshold, it is determined that the adjustment of the angle of view is necessary (YES in step S804), and then the processing proceeds to step S805.

In step S805, the system control unit 201 refers to the above-described focus limit tables based on the size difference calculated in S803, the current zoom position, and the current subject distance. Then, the system control unit 201 determines the change-side limit of the search range of the in-focus position (focus search range), and then the processing proceeds to S806.

In step S806, the target size acquired in step S801 and the detected size acquired in S802 are compared, and the zoom control direction is determined by the system control unit 201. If the target size is larger than the detected size (YES in step S806), it is understood that the subject is present in a direction away from the camera 101 and the subject needs to be enlarged. Then, the processing proceeds to step S807.

In step S807, the current-side limit is set to the NEAR side limit, and the focus search range is limited to the FAR direction. The system control unit 201 instructs the lens driving unit 204 to perform zoom control in the TELE direction via the zoom control unit 205 and the focus control unit 206, and then the processing of FIG. 10 ends.

In a case where the target size is smaller than the detected size in step S806 (NO in step S806), it is understood that the subject is in a direction approaching the camera 101 and the subject needs to be captured in a smaller size. Thus, the processing proceeds to step S808. In step S808, the current-side limit is set to the FAR side limit, and the focus search range is limited to the NEAR direction. The system control unit 201 instructs the lens driving unit 204 to perform zoom control in the WIDE direction via the zoom control unit 205 and the focus control unit 206, and the processing in FIG. 10 ends.

In both of steps S807 and S808, during the zoom control, the system control unit 201 instructs the lens driving unit 204 to perform autofocus control within the focus search range via the zoom control unit 205 and the focus control unit 206. Specifically, the autofocus control is performed in the search range in the FAR direction during the zoom control in the TELE direction, and the autofocus control is performed in the search range in the NEAR direction during the zoom control in the WIDE direction.

If the subject is already in focus at the start of the zoom control, the autofocus control is not performed, and the zoom lens and the focus lens are controlled along the cam track curve for the current subject distance. That is, when the subject is in focus at the start of the control of the zoom lens, the focus control unit 206 controls the focus lens along the cam track curve and does not search for the in-focus position.

By performing the processing operation illustrated in FIG. 10, the focus search range during the zoom control is limited based on the detected size of the subject and the target size information set in advance. As a result, a zoom function is realized that prevents a subject from being lost due to deterioration in video quality or detection failure.

In the above description, an example in which the tracking settings related to the automatic tracking imaging can be changed by a user is described, but the tracking settings may be fixed.

In the above description, an example in which the pan/tilt control, the zoom control, and the autofocus control are performed is described. However, the control apparatus according to the present exemplary embodiment of the present disclosure may perform the zoom control and the autofocus control without performing the pan/tilt control.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-080064, filed May 15, 2023, which is hereby incorporated by reference herein in its entirety.

What is claimed is:

1. A control apparatus comprising:
at least one memory storing instructions; and
at least one processor that, upon execution of the stored instructions, configures the at least one processor to:
acquire a size of a subject in a captured image;
calculate a difference between the acquired size of the subject and a target size;
control a position of a zoom lens so that the calculated difference reduces;
identify a search range to determine a position of a focus lens, based on the position of the zoom lens and the calculated difference; and
cause an image capture device to execute autofocus control to focus on the subject within the identified search range.

2. The control apparatus according to claim 1, wherein, in a case where the acquired size of the subject is larger than the target size, the search range is identified to be closer to a near side than a current subject distance.

3. The control apparatus according to claim 1, wherein, in a case where the acquired size of the subject is smaller than the target size, the search range is identified to be closer to a far side than a current subject distance.

4. The control apparatus according to claim 1, wherein the search range is identified such that the search range is narrower as the calculated difference decreases.

5. The control apparatus according to claim 4, wherein the search range is acquired from data stored in advance with a subject distance and the position of the zoom lens as parameters in the acquisition.

6. The control apparatus according to claim 4, wherein the search range is identified such that the search range is wider as a moving speed of the zoom lens is higher than a current speed.

7. An imaging apparatus, comprising:
at least one memory storing instructions; and
at least one processor that, upon execution of the stored instructions configures the at least one processor to:
acquire a size of a subject in a captured image;
calculate a difference between the acquired size of the subject and a target size;
control a position of a zoom lens so that the calculated difference reduces;
identify a search range to determine a position of a focus lens, based on the position of the zoom lens and the calculated difference; and
cause an image capture device to execute autofocus control to focus on the subject within the identified search range;
an imaging optical system including the zoom lens and the focus lens; and
an imaging unit configured to capture an image obtained by the imaging optical system.

8. A method for controlling a control apparatus, the method comprising:
acquiring a size of a subject in a captured image;
calculating a difference between the acquired size of the subject and a target size;
controlling a position of a zoom lens to reduce the calculated difference;
identifying a search range to determine a position of a focus lens, based on the position of the zoom lens and the calculated difference; and
causing an image capture device to execute autofocus control to focus on the subject within the identified search range.

9. The method according to claim 8, wherein, in a case where the acquired size of the subject is larger than the target size, the search range is identified to be closer to a near side than a current subject distance.

10. The method according to claim 8, wherein, in a case where the acquired size of the subject is smaller than the target size, the search range is identified to be closer to a far side than a current subject distance.

11. The method according to claim 8, wherein the search range is identified such that the search range is narrower as the calculated difference decreases.

12. The method according to claim 11, wherein the search range is acquired from data stored in advance with a subject distance and the position of the zoom lens as parameters in the acquisition.

13. The method according to claim 11, wherein the search range is identified such that the search range is wider as a moving speed of the zoom lens is higher than a current speed.

14. A non-transitory computer-readable storage medium storing instructions that, when executed by at least one processor, configures the at least one processor to execute a method, the method comprising:
   acquiring a size of a subject in a captured image;
   calculating a difference between the acquired size of the subject and a target size;
   controlling a position of a zoom lens to reduce the calculated difference;
   identifying a search range to determine a position of a focus lens, based on the position of the zoom lens and the calculated difference; and
   causing an image capture device to execute autofocus control to focus on the subject within the identified search range.

* * * * *